US006628934B2

(12) United States Patent
Rosenberg et al.

(10) Patent No.: US 6,628,934 B2
(45) Date of Patent: Sep. 30, 2003

(54) SYSTEMS AND METHODS FOR AUTOMATICALLY PROVISIONING WIRELESS SERVICES ON A WIRELESS DEVICE

(75) Inventors: Dave H. Rosenberg, San Francisco, CA (US); Michael S. Melnicki, San Francisco, CA (US)

(73) Assignee: Earthlink, Inc., Atlanta, GA (US)

( * ) Notice: Subject to any disclaimer, the term of this patent is extended or adjusted under 35 U.S.C. 154(b) by 278 days.

(21) Appl. No.: 09/905,089

(22) Filed: Jul. 12, 2001

(65) Prior Publication Data

US 2003/0013434 A1 Jan. 16, 2003

(51) Int. Cl.⁷ .................................................. H04Q 7/20
(52) U.S. Cl. ........................................ 455/411; 455/414
(58) Field of Search ............................. 455/414, 406, 455/407, 410, 411, 420, 466, 435; 709/219, 220, 221, 222; 717/176; 370/338, 352–356, 401, 465, 466; 713/168, 184

(56) References Cited

U.S. PATENT DOCUMENTS

| 5,819,173 A | * | 10/1998 | Lawrence et al. | .......... 455/515 |
|---|---|---|---|---|
| 5,835,580 A | | 11/1998 | Fraser | |
| 5,956,636 A | * | 9/1999 | Lipsit | .......................... 455/411 |
| 6,012,088 A | * | 1/2000 | Li et al. | ...................... 709/219 |
| 6,104,796 A | | 8/2000 | Kasrai | |
| 6,138,110 A | | 10/2000 | Jahn et al. | |
| 6,144,849 A | | 11/2000 | Nodoushani et al. | |
| 6,243,572 B1 | * | 6/2001 | Chow et al. | ................. 455/408 |
| 6,295,291 B1 | * | 9/2001 | Larkins | ....................... 370/352 |
| 6,529,727 B1 | * | 3/2003 | Findikli et al. | ............. 455/411 |
| 6,550,010 B1 | * | 4/2003 | Link, II et al. | ............. 455/410 |

OTHER PUBLICATIONS

"Wireless Intelligent Network Over–The–Air Service Provisioning," technical brochure, Lucent Technologies, printed from the Internet at www.lucent.com/livelink/146175_Brochure.pdf, Mar. 27, 2001.

* cited by examiner

Primary Examiner—Nguyen T. Vo
Assistant Examiner—Jean A Gelin
(74) Attorney, Agent, or Firm—Morris, Manning & Martin, LLP

(57) ABSTRACT

Systems and methods for automatically activating wireless services on a wireless device are provided. The systems and methods of the present invention comprise a software and hardware infrastructure that enables a wireless service provider to automatically register a wireless device on a wireless network and a wireless device user to automatically activate wireless services on the wireless device. The wireless services may be part of a wireless service plan provided by the wireless service provider to the wireless device user on a per fee basis.

40 Claims, 13 Drawing Sheets

Activate Service

| MODEM TYPE | SERVICE PLANS | AVAILABILITY | SUBTOTAL | BILLING | ACCOUNT | REVIEW ORDER | CONFIRMATION |

Select your Service

OmniSky gives you the choice of several service plans, so you can find the one that best fits your needs. Please select only one plan below.

Service Only (for EID 0060D6666122)

- ○ Annual Prepaid Service Plan
  Twelve (12) months of unlimited usage billed at time of activation at $359.95. (Equivalent to $29.99 a month; a 25% savings over standard monthly service payment plans.); $100 instant rebate on your OmniSky wireless modem with annual service plan activation*

- ○ Annual Service Plan
  $39.95 per month for twelve months of unlimited usage; $100 instant rebate on your OmniSky wireless modem with annual service plan activation*

- ⦿ Monthly Service Plan
  $39.95 per month; unlimited usage. No Contract Required.

*$100 rebate will appear on your credit card at the same time as charge for service activation. 12-month service contract required. Early termination fees will apply if subscriber cancels subscription before 12 months of service.

Activate Service

| MODEM TYPE | SERVICE PLANS | ∴ AVAILABILITY ∴ | SUBTOTAL | BILLING | ACCOUNT | REVIEW ORDER | CONFIRMATION |

Confirm OmniSky Service Availability

The OmniSky service is carried on the CDPD (Cellular Digital Packet Data) network and is available in most major metropolitan areas. To see if it's available where you plan to use it, enter a zip code and click Continue.

Check availability by zip code
[94118] — 79

Continue ⟩ — 80

If you experience problems, please contact Customer Support at 1-800-860-5767.
Jobs | Terms and Conditions | Privacy Statement | Contact OmniSky
Copyright © 2000, OmniSky Corporation

FIG. 8

Activate Service

| MODEM TYPE | SERVICE PLANS | AVAILABILITY | SUBTOTAL | BILLING | ACCOUNT | REVIEW ORDER | CONFIRMATION |
|---|---|---|---|---|---|---|---|

Activate your OmniSky Service

Please verify your order.

| Item | Qty | Price |
|---|---|---|
| OmniSky Email | 1 | $0.00 |
| Month to Month Service | 1 | $39.95 |
| Activation Fee | 1 | $0.00 |
| | Subtotal | $39.95 |
| | Total | $39.95 |

[Continue >]

If you experience problems, please contact Customer Support at 1-800-860-5767.
Jobs | Terms and Conditions | Privacy Statement | Contact OmniSky
Copyright © 2000, OmniSky Corporation

Activate Service

| MODEM TYPE | SERVICE PLANS | AVAILABILITY | SUBTOTAL | BILLING | ACCOUNT | REVIEW ORDER | CONFIRMATION |

Create Account

Create the username and password that you will use to access your OmniSky service, online account information, and optional Omnisky.net email account.

Your username must be 3-12 characters and the first three characters must be letters; all characters must be lowercase. For security, we recommend that your username and password contain both letters and numbers; passwords can't be the same username forwards or backwards.
Please do not use special characters other than underscores.

Choose a user name: [navin]@omnisky.com (Must be 3-12 characters) — 87a

Choose password: [•••••••] (Must be 6-12 characters. Case sensitive requires both letters and numbers) — 87b Confirm password: [•••••••] — 87c Yes, I'd like to receive:
- ☑ OmniSky Update - OmniSky newsletter with news, technical tips, upgrade and other essential information. — 88a
- ☑ OmniSky Email - time sensitive OmniSky announcements and promotions. — 88b
- ☑ OmniSky Partner Specials - carefully selected offers from OmniSky's partners. — 88c OmniSky respects your privacy. Read our Privacy Policy to learn more.

[ Continue ] — 89

If you experience problems, please contact Customer Support at 1-800-860-5767.
Jobs | Terms and Conditions | Privacy Statement | Contact OmniSky
Copyright © 2000, OmniSky Corporation

FIG. 11

Activate Service

| MODEM TYPE | SERVICE PLANS | AVAILABILITY | SUBTOTAL | BILLING | ACCOUNT | REVIEW ORDER | CONFIRMATION |

Review Order

Click on Place Order to complete your order

[Place Order] — 91a

| Item | Qty | Price |
|---|---|---|
| OmniSky Email | 1 | $0.00 |
| Month to Month Service | 1 | $39.95 |
| Activation Fee | 1 | $0.00 |
| | Subtotal | $39.95 |
| | Total | $39.95 |

User Name: daver1119

Bill to:
Navin Johnson
OmniSky
1 Oak st
San Francisco, CA 94118
4155551212

Payment Method:
Visa: ************1111
Expires: 11/2001
Navin Johnson
Send receipt to: navin@johnson.com

[edit]

Your credit card will be billed monthly for service.

Click on Place Order to complete your order

[Place Order] — 91b

If you experience problems, please contact Customer Support at 1-800-860-5767.
Jobs I Terms and Conditions I Privacy Statement I Contact OmniSky
Copyright © 2000, OmniSky Corporation

FIG. 12

Activate Service

Thank You - Please Print Receipt

Your Account

IMPORTANT! This receipt is your only personal record of your Activation Code, User Name and Password, which you will need to install your OmniSky software.

Account ID: 163185

User Name: daver1119
Password:
Activation Code: A694-39E8-045B
Email: dr@omnisky.com Bill to:
Navin Johnson
OmniSky
1 Oak st San Francisco, CA 94118

415-555-1212

Payment Method:
AMEX: ************1007
Expires: 05/2002
Navin Johnson
Send receipts to: dr@omnisky.com Your credit card will be billed monthly for service.

Your Order

| Item | Qty | Price |
|---|---|---|
| OmniSky Email | 1 | $0.00 |
| Month to Month Service | 1 | $39.95 |
| Activation Fee | 1 | $0.00 |
| | Subtotal | $39.95 |
| | Total | $39.95 |

If you experience problems, please contact Customer Support at 1-800-860-5767.
Jobs | Terms and Conditions | Privacy Statement | Contact OmniSky
Copyright © 2000, OmniSky Corporation

FIG. 13

SYSTEMS AND METHODS FOR AUTOMATICALLY PROVISIONING WIRELESS SERVICES ON A WIRELESS DEVICE

FIELD OF THE INVENTION

This invention relates generally to wireless services on a wireless device. More specifically, the present invention provides systems and methods for automatically activating wireless services on a wireless device.

BACKGROUND OF THE INVENTION

The Internet and the World Wide Web (hereinafter "the web") have revolutionized the ways in which information is disseminated and shared. At any given time, the Internet enables millions of users worldwide to communicate, access a wide variety of information, and engage in activities as diverse as shopping, playing games, and financial trading, among others.

The vast array of services provided in the Internet has driven users to demand Internet access from anywhere in the globe. As a result, a new set of networking technologies have been developed. Users can now choose between high speed Internet connections provided by T1 or T3 lines leased from telephone companies, telephone and cable modems, digital subscriber lines (DSL), and wireless networks. In particular, the emergence of wireless networks has enabled mobile Internet access through various "wireless devices", which are electronic devices configured with a wireless Internet access system. Wireless devices include, but are not limited to, microprocessor based devices such as personal and portable computers, set-top boxes, video game consoles, and handheld appliances such as cellular phones, personal digital assistants (PDAs) and electronic organizers.

Mobile users connected to a wireless network can access the Internet on a wireless device from any location covered by the network. Wireless networks include personal area networks (WPANs) based on the Bluetooth™ standard, wireless local area networks (WLANs) based on the Institute of Electrical and Electronics Engineers (IEEE) 802.11 standards, and wireless wide area networks (WWANs) based on open wireless standards such as AMPS, GSM, TDMA, CDMA, and CDPD. Both WPANs and WLANs offer limited user mobility, while WWANs allow users to roam freely across extensive geographic areas.

At present, most mobile users access the Internet through a WWAN by using a wireless device equipped with a wireless modem and Internet access software. The wireless modem may be either internally integrated into the Internet appliance, such as in the case of the Palm VIIx PDA, manufactured by Palm, Inc., of Santa Clara, Calif., or connected externally. External wireless modems include the Ricochet modem, manufactured by Metricom, Inc., of San Jose, Calif., for use with personal and portable computers across a proprietary WWAN owned and operated by Metricom, and the various modems manufactured by Novatel Wireless, Inc., of San Diego, Calif., and Sierra Wireless, Inc., of Richmond, BC, for use with PDAs and cellular phones across WWANs operated by a wireless carrier, such as Sprint PCS, of Overland Park, Kans., Verizon Wireless, of New York City, N.Y., and AT&T wireless, of Seattle, Wash.

The Internet access software may consist of a "web browser", such as Internet Explorer, available from Microsoft Corporation, of Redmond, Wash., or a "microbrowser", which is a simpler version of a web browser with reduced graphic capabilities. In addition, the Internet access software may contain a variety of APIs (application program interfaces) and associated applications for formatting and displaying "web pages" on the Internet appliance. A web page is a multimedia composition that may contain text, audio, graphics, imagery, video, and nearly any other type of content that may be experienced on a wireless device or other Internet appliances. A web page may also be interactive, and contain user selectable links that cause other web pages to be displayed, forms that may be used by the user to submit information requested in the web page, interactive executable code, or other elements through which the user may interact with web pages. A group of one or more interconnected and closely related web pages is referred to as a "web site."

A web site has a particular address associated with it called a Uniform Resource Locator ("URL"). To view a particular web site, users input its corresponding URL on the wireless device either by typing the URL address on a web browser window or "tapping" an icon or menu button on a PDA screen or cellular phone. The web site is transmitted via a wired connection from a "web server" on the Internet to a "base station", which is a radio tower that provides radio coverage to a given geographic area known as a "cell." The base station then transmits the web site to the user's wireless device through radio waves.

To access web pages and other Internet content on a WWAN, users are required to subscribe to a wireless service plan offered by a wireless service provider. A wireless service provider is a company that offers cellular phone service and/or wireless Internet service including e-mail and web access through a WWAN. Examples of wireless service providers offering Internet access include Verizon Wireless, Metricom, Inc., Sprint PCS, and OmniSky Corporation, of San Francisco, Calif. The wireless service plans are provided on a monthly or annual fee basis, with the fee depending on the type of services and geographic coverage desired.

Typically, users purchase the service plan at a retail store, web site associated with the wireless service provider, or by calling a customer service representative. Users may purchase the service plan together or after purchasing the wireless device. In addition, users may add or change a service plan at any time after purchase.

To use the services provided in the service plan, users must first "activate" the services in their wireless devices. The activation process typically requires a series of steps involving the user and the wireless service provider. The steps may consist of the user providing a unique identification code associated with the wireless device or wireless modem, selecting a specific service plan, and providing personal and financial information to the wireless service provider for the purposes of billing the service plan. The activation process may also require the user to select a user name and a password for accessing the wireless services. The information may be provided on a web site or by calling a personal customer service representative.

As part of the activation process, the wireless service provider registers the wireless device on user databases, servers, and/or billing systems. The wireless service provider may also assign an IP address to the wireless device, and may further instruct the user to install any activation codes or software on the wireless device. During the installation process, the user may be required to install software and/or enter an activation code on the wireless device.

At present, the activation process cannot be performed without requiring human interaction with a customer service representative or a time delay before the wireless services become activated on the wireless device. Users of the Ricochet network, for example, are required to wait 48 hours for a service plan to be activated on their wireless devices after selecting a service plan on a web site. Users dealing with customer service representatives quite often incur delays before their service plans are ready for use. In short, there are currently no provisions in place for wireless service providers to automatically activate wireless services for wireless device users without requiring human interaction or time delays in activating the services.

In view of the foregoing drawbacks, it would be desirable to provide systems and methods for automatically activating wireless services on multiple wireless devices.

It further would be desirable to provide systems and methods for a wireless service provider to automatically register a wireless device on a wireless network and provision wireless services for the wireless device without requiring the user to interact with a customer service representative or incur time delays to activate the services.

It also would be desirable to provide systems and methods for a wireless service provider to enable a wireless device user to select a wireless service plan on a web site, provide device-specific, personal, and financial information on the web site, and receive an activation code to automatically activate the wireless service plan for use on the wireless device.

SUMMARY OF THE INVENTION

In view of the foregoing, it is an object of the present invention to provide systems and methods for automatically activating wireless services on multiple wireless devices.

It is a further object of the present invention to provide systems and methods for a wireless service provider to automatically register a wireless device on a wireless network and provision wireless services for the wireless device without requiring the user to interact with a customer service representative or incur time delays to activate the services.

It is also an object of the present invention to provide systems and methods for a wireless service provider to enable a wireless device user to select a wireless service plan on a web site, provide device-specific, personal, and financial information on the web site, and receive an activation code to automatically activate the wireless service plan for use on the wireless device.

These and other objects of the present invention are accomplished by providing systems and methods for automatically provisioning wireless services on a wireless device. The wireless services may include cellular phone service, e-mail, Internet access, games, financial trading, and location-aware services, among others. Location-aware services are services provided to a wireless device user according to the user's geographic location. Such services may include weather, restaurant reservation services, travel services, mapping services, among others. The wireless services are provided according to a fee-based wireless service plan offered by the wireless service provider and selected by the user.

The systems and methods consist of a software and hardware infrastructure that enables a wireless service provider to automatically register a wireless device on a wireless network and a wireless device user to automatically activate wireless services on the wireless device. The wireless services are selected by the wireless device user by means of an activation web site. The activation web site contains on-line forms to enable a wireless device user to submit device-specific, personal, and financial information to the wireless service provider. The information is provided for registering the wireless device on the wireless network and billing the wireless device user for accessing the wireless services.

In a preferred embodiment, the systems and methods of the present invention involve the following main components: (1) an activation web site; (2) an activation web server; (3) a user database; (4) a billing server; (5) an IP address database; (6) a messaging server; (7) wireless application servers; and (8) an activation module on the wireless device.

The activation web site is a web site maintained by the wireless service provider to allow wireless device users to select a wireless service plan. The wireless service plan specifies the wireless services available to the wireless device users and the fees associated with the service plan. The wireless services may not be available in all geographic regions due to the restricted coverage area of the wireless network. When selecting the service plan, users are required to submit personal and financial information for billing purposes. Users may also be asked to select a username and password for accessing the wireless services on the wireless device.

In addition, users are able to submit device-specific information on the web site to identify the wireless device unit for which the wireless services are to be activated. The device-specific information may include the wireless device's serial number, the wireless modem equipment identifier (EID), or any other identification information associated with the wireless device and understood by the wireless service provider.

The activation web site is provided to wireless device users by the activation server. The activation server processes all the requests submitted on the activation web site by the wireless device users. The activation server creates a record for each wireless device user containing the information submitted on the activation web site. The user records are stored into a user database associated with a billing server. The billing server handles the billing and payment of the wireless service plan fees charged by the wireless service provider to the wireless device user.

A messaging server polls the user record from the user database and sends the relevant user data to one or more wireless application servers responsible for a given wireless service. For example, the messaging server sends the user's record to a wireless e-mail server for registering a new e-mail account for the user.

Additionally, the activation server selects an IP address and a side preference associated with the wireless carrier in the WWAN for each wireless device specified by the user. The IP address is selected from an IP address database that maintains an inventory of IP addresses that are available for activation. To reduce the risk of fraud when an IP address and side preference are provided to a user, the activation server encodes the IP address and the side preference into an activation code. The activation code may be a hash of the IP address and side preference with appended checksum characters for error correction.

The activation code is then posted on the activation web site for the user. To complete the activation of the wireless services, the user executes an activation module on the wireless device. The user logs into the device with the username and password selected at the web site, and enters the activation code into a window provided by the activation module on the device's screen. The activation module decodes the activation code back into the IP address and side preference and programs them into the wireless modem's memory, thereby activating the wireless services on the wireless device. The user may select a different wireless service plan or de-activate the wireless services at any time after activation.

The activation module also enables the user to specify any preferences associated with the use of the wireless services. The preferences may include a personal web site to be displayed to the user when logging into the device, a list of favorite web sites, and a list of preferred financial stocks, among others.

Advantageously, the present invention enables a wireless device user to have immediate access to wireless services on a wireless device without having to interact with a customer service representative or incur time delays before using the wireless services. The present invention also enables a wireless service provider to automatically handle the activation and billing of wireless services for multiple wireless device users.

BRIEF DESCRIPTION OF THE DRAWINGS

The foregoing and other objects of the present invention will be apparent upon consideration of the following detailed description, taken in conjunction with the accompanying drawings, in which like reference characters refer to like parts throughout, and in which:

FIG. 7 is a screenshot of a web page on the activation web site for selecting a wireless service plan;

FIG. 8 is a screenshot of a web page on the activation web site for providing the geographic location where the wireless device user plans to use the wireless services;

FIG. 9 is a screenshot of a web page on the activation web site for verifying the wireless service plan order;

FIG. 10 is a screenshot of a web page on the activation web site for providing personal and financial information for the purposes of billing the wireless service plan fees;

FIG. 11 is a screenshot of a web page on the activation web site for selecting a username and password to use the wireless services on the wireless device;

FIG. 12 is a screenshot of a web page on the activation web site for placing the wireless service plan order; and FIG. 13 is a screenshot of a web page on the activation web site for confirming the wireless service plan order and posting the activation code for the wireless device user.

DETAILED DESCRIPTION OF THE INVENTION

Figure 1:
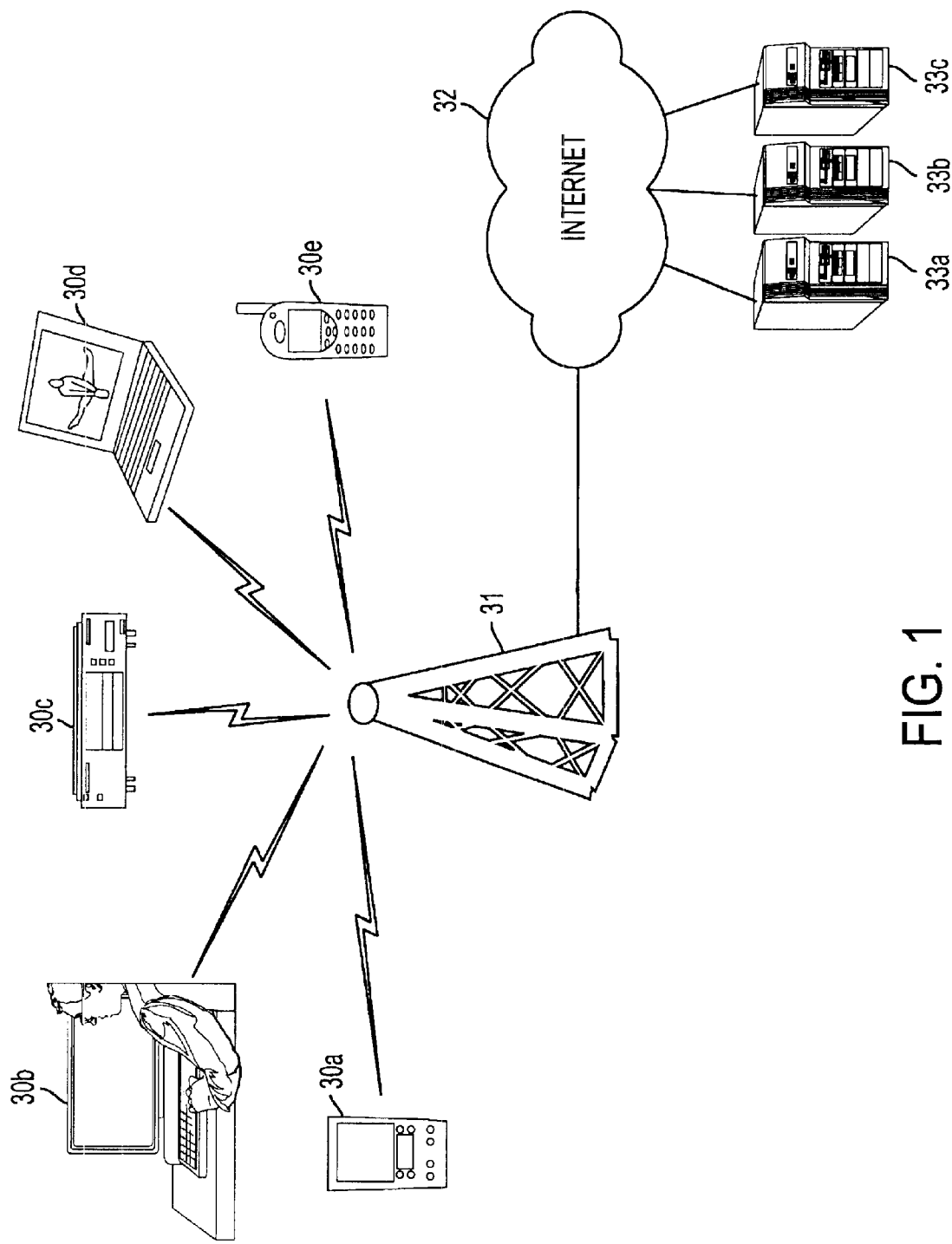
FIG. 1 is an illustrative view of the network environment in which the present invention operates.

Referring to FIG. 1, an illustrative view of the network environment in which the present invention operates is described. Wireless devices 30a–e are equipped with a wireless modem and Internet access software to connect to Internet 32 by means of a WWAN represented by base station 31. Wireless devices 30a–e include personal digital assistant (PDA) 30a, personal computer 30b, set-top box or entertainment system 30c, portable computer 30d, and cellular phone 30e. Examples of PDA 30a include the Palm handheld devices manufactured by Palm, Inc., of Santa Clara, Calif., the Handspring Visor manufactured by Handspring, Inc., of Mountain View, Calif., and the HP Jornada manufactured by the Hewlett-Packard Company of Palo Alto, Calif. PDA 30a may also consist of appliances having the functions of a PDA and a cellular phone, such as the PDA Phone manufactured by Samsung Electronics, Co., Ltd., of Seoul, South Korea, and the Kyocera QCP 6035 Smartphone manufactured by Kyocera Wireless Corp., of San Diego, Calif.

Wireless devices 30a–e may have an internal or external wireless modem. An example of PDA 30a having an internal modem is the Palm VIIx, manufactured by Palm, Inc., of Santa Clara, Calif. External wireless modems include the Ricochet modem, manufactured by Metricom, Inc., of San Jose, Calif., and the various modems manufactured by Novatel Wireless, Inc., of San Diego, Calif., and Sierra Wireless, Inc., of Richmond, BC.

The Internet access software may consist of a web browser, such as Internet Explorer, developed by Microsoft Corporation, of Redmond, Wash., or a microbrowser, which is a simpler version of a web browser with reduced graphic capabilities. In addition, the Internet access software may contain a variety of APIs (application program interfaces) and associated applications for formatting and displaying web pages on wireless devices 30a–e. The web pages are transmitted via a wired connection from one or more web servers 33a–c on Internet 32 to base station 31. Base station 31 transmits the web pages and other Internet content to wireless devices 30a–e through radio waves. In addition, base station 31 may also transmit voice and other data to wireless devices 30a–e.

Base station 31 may be part of a proprietary WWAN, such as the proprietary WWAN operated by Metricom for personal computer 30a and portable computer 30d having a Ricochet modem, or part of a WWAN operated by a wireless carrier, such as Sprint PCS, of Overland Park, Kans., Verizon Wireless, of New York City, N.Y., and AT&T Wireless, of Seattle, Wash.

To access web pages and other Internet content via base station 31, users of wireless devices 30a–e are required to subscribe to a wireless service plan offered by a wireless service provider. A wireless service provider is a company that offers cellular phone service and/or wireless Internet service including e-mail and web access through a WWAN. Examples of wireless service providers offering Internet access include Verizon Wireless, Metricom, Inc., Sprint PCS, and OmniSky Corporation, of San Francisco, Calif. The wireless service plans are provided on a per fee basis, with the fee depending on the type of services and geographic coverage desired.

Typically, users of wireless devices 30a–e purchase the service plan at a retail store, web site associated with the wireless service provider, or by calling a customer service representative. Users of wireless devices 30a–e may purchase the service plan together or after purchasing wireless devices 30a–e. In addition, users of wireless devices 30a–e may add or change a service plan at any time after purchase. As described hereinbelow, users of wireless devices 30a–e may automatically activate the wireless services provided in a service plan on wireless devices 30a–e.

It should be understood by one skilled in the art that wireless devices other than wireless devices 30a–e may used to access voice, data, and Internet content via base station 31. Further, wireless services may be automatically activated on any wireless device capable of accessing a wireless network, including a wireless personal area network (WPAN), a wireless local area network (WLAN), or a wireless wide area network (WWAN).

Figure 2:
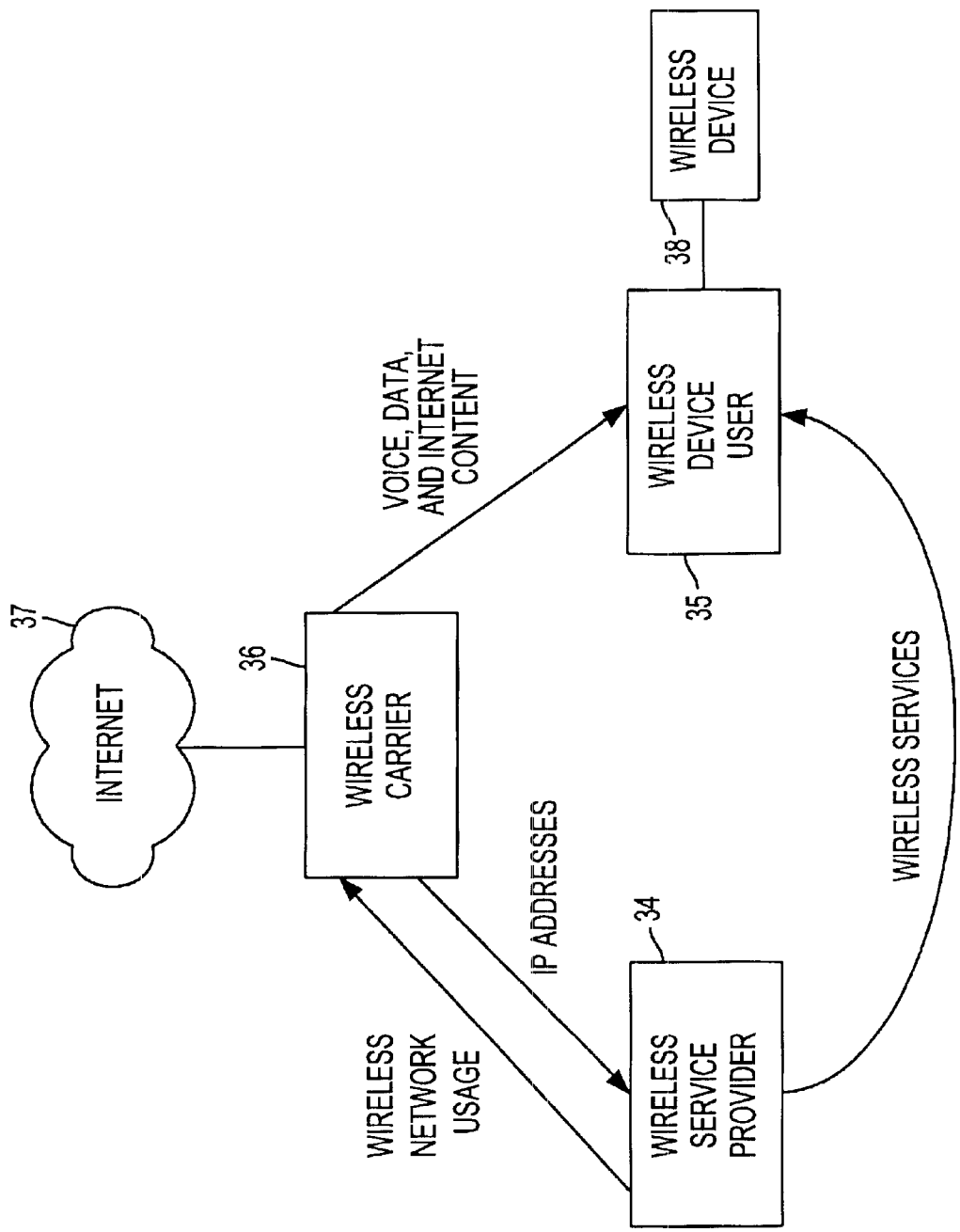
FIG. 2 is an illustrative view of the parties and relationships involved in providing and automatically activating wireless services to wireless users in accordance with the principles of the present invention.

Referring now to FIG. 2, an illustrative view of the parties and relationships involved in providing and automatically activating wireless services to wireless users in accordance with the principles of the present invention is described. Wireless service provider 34 is a company that offers wireless services to wireless device user 35 by means of a wireless network operated by wireless carrier 36. Examples of wireless service providers include Verizon Wireless, Metricom, Inc., Sprint PCS, and OmniSky Corporation, of San Francisco, Calif. The wireless services may include cellular phone services, data services, and/or wireless Internet services, such as e-mail and web access. The wireless services may be a part of wireless service plan that is offered to wireless device user 35 on a per fee basis, with the fee depending on the type of services and geographic coverage desired. Wireless device user 35 accesses the wireless services from wireless device 38 in which the services are activated. Wireless device 38 may be any wireless device capable of accessing voice, data, and/or Internet content through a wireless network. Wireless device 38 may be equipped with a wireless modem and Internet access software.

Wireless carrier 36 is a company that operates a wireless network, such as Sprint PCS, of Overland Park, Kans., Verizon Wireless, of New York City, N.Y., and AT&T wireless, of Seattle, Wash. Wireless carrier 36 may sell or rent network usage privileges to wireless service provider 34, including wireless access to Internet 37. In addition, wireless carrier 36 may allocate a number of IP addresses to wireless service provider 34 for distribution to wireless device user 35. An IP address is assigned to wireless device 38 used by wireless device user 35 to access the wireless services provided by wireless service provider 34. As described hereinbelow, the wireless services are automatically activated in wireless device 38. The IP address is assigned while the wireless services are being activated.

It should be understood by one skilled in the art that wireless service provider 34 may perform the roles of wireless carrier 36 and vice-versa. For example, Sprint PCS is both a wireless carrier and a wireless service provider.

Figure 3:
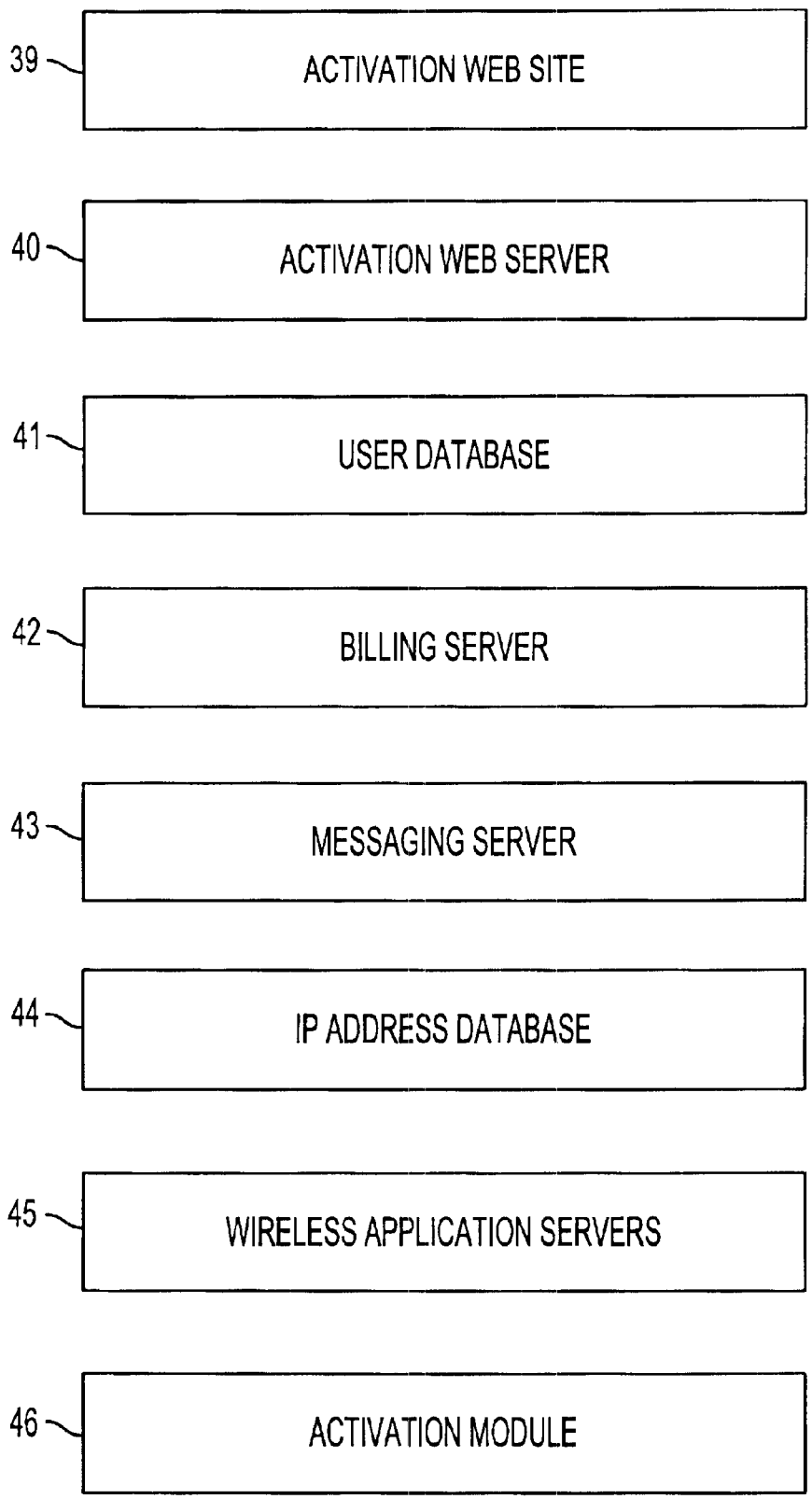
FIG. 3 is a schematic view of the components used in a preferred embodiment of the present invention.

Referring now to FIG. 3, a schematic view of the components used in a preferred embodiment of the present invention is described. The software and hardware components that enable wireless service provider 34 to automatically activate wireless services on wireless device 38 include: (1) activation web site 39; (2) activation web server 40; (3) user database 41; (4) billing server 42; (5) messaging server 43; (6) IP address database 44; (7) wireless application servers 45; and (8) activation module 46.

Activation web site 39 is a web site maintained by wireless service provider 34 to allow wireless device user 35 to select a wireless service plan for accessing voice, data, and Internet content via wireless carrier 36. The wireless service plan specifies the wireless services available to wireless device user 35 as well as the fees associated with the service plan. When selecting the service plan, wireless device user 35 is required to submit personal and financial information on activation web site 39 for billing purposes. Wireless device user 35 may also be asked to select a username and password for accessing the wireless services on wireless device 38.

Additionally, wireless device user 35 enters device-specific information in activation web site 39 to identify wireless device 38 for which the wireless services are to be activated. The device-specific information may include the serial number of wireless device 38, the wireless modem equipment identifier (EID), or any other identification information associated with wireless device 38 and understood by wireless service provider 34.

Activation web site 39 is provided to wireless device user 35 by activation server 40. Activation server 40 handles all the requests submitted on activation web site 39 by wireless device user 35. Activation server 40 creates a record for wireless device user 35 containing the information submitted on activation web site 39. The user records are stored into user database 41 associated with billing server 42. Billing server 42 handles the billing and payment of the wireless service plan fees charged by wireless service provider 34 to wireless device user 35.

Messaging server 43 polls the user record from user database 41 and sends the relevant user data to one or more wireless application servers 45 responsible for a given wireless service. For example, messaging server 43 may send the user's record to a wireless e-mail server for registering a new e-mail account for wireless device user 35.

Additionally, activation server 40 selects an IP address and a side preference associated with wireless carrier 36 for wireless device 38 specified by wireless device user 35. The IP address is selected from IP address database 44 that maintains an inventory of IP addresses that are available for activation. To reduce the risk of fraud when an IP address and side preference are provided to wireless device user 35, activation server 40 encodes the IP address and the side preference into an activation code. The activation code may be a hash of the IP address and side preference with appended checksum characters for error correction. The IP address, side preference, and activation code may also be stored in the user record in user database 54.

The activation code is posted on activation web site 39 for wireless device user 35. To complete the activation of the wireless services on wireless device 38, wireless device user 35 executes activation module 46 on wireless device 38. Wireless device user 35 logs into wireless device 38 with the username and password selected at activation web site 39, and enters the activation code into a window provided by activation module 46 on the screen of wireless device 38. Alternatively, wireless device user 35 may provide the activation code to activation module 46 on wireless device 38 by typing the activation code on a keyboard or PDA screen, clicking on cellular phone keys, or through any other means used on wireless devices for entering information. Activation module 46 decodes the activation code back into the IP address and side preference and programs them into the memory of the wireless modem of wireless device 38, thereby activating the wireless services on wireless device 38. Wireless device user 35 may select a different wireless service plan or de-activate the wireless services at any time after activation.

Activation module 46 also enables wireless device user 35 to specify any preferences associated with the use of the wireless services. The preferences may include a personal web site to be displayed to wireless device user 35 when logging into wireless device 38, a list of favorite web sites, and a list of preferred financial stocks, among others.

Figure 4:
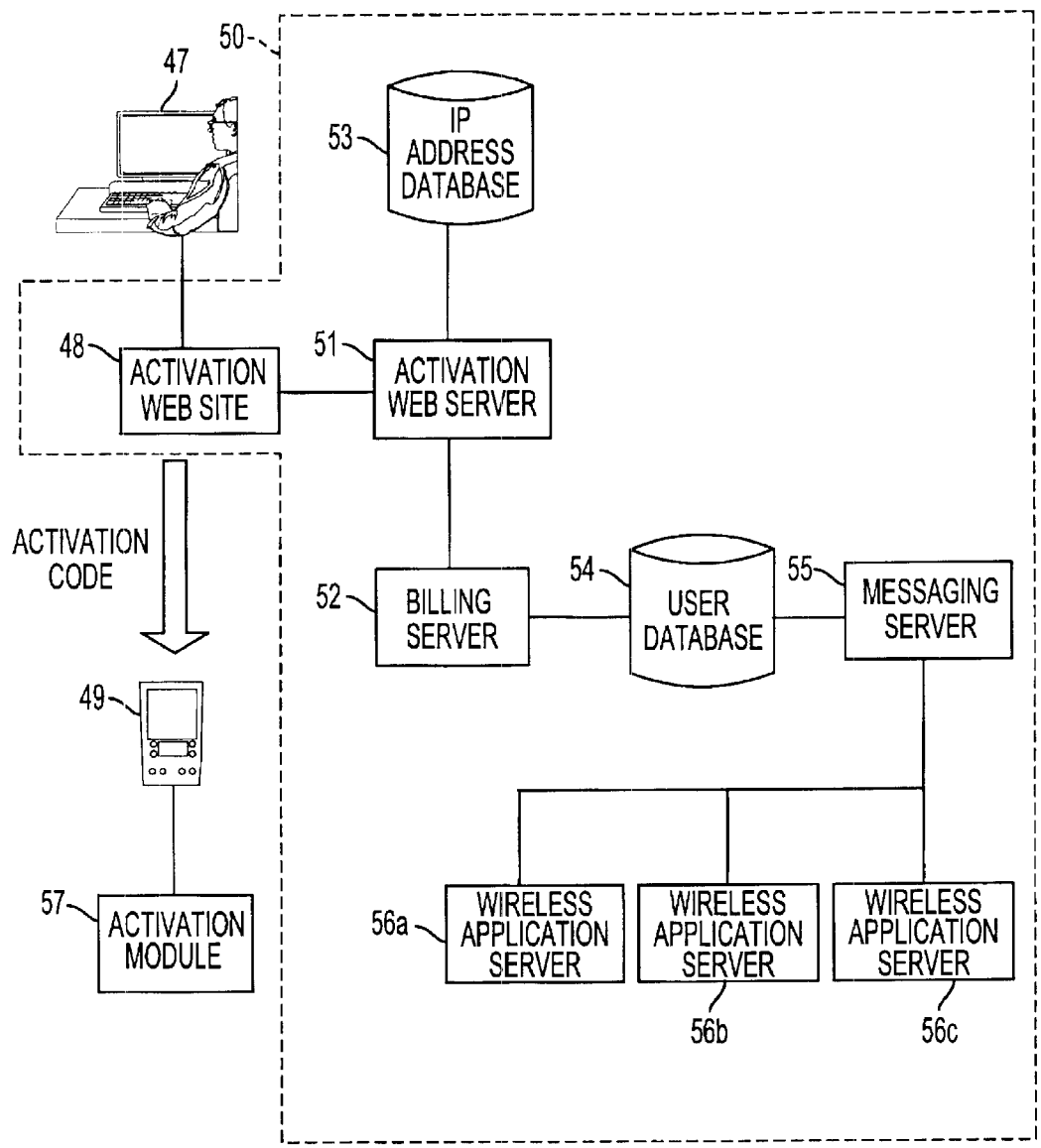
FIG. 4 is a schematic diagram of the system in accordance with the principles of the present invention.

Referring now to FIG. 4, a schematic diagram of the system in accordance with the principles of the present invention is described. Wireless device user 47 accesses activation web site 48 to activate wireless services on wireless device 49. The wireless services may include cellular phone service, data services, and/or wireless Internet access. As part of the activation process, activation web site 48 requests wireless device user 47 to select a wireless service plan from a list of wireless service plans offering a variety of wireless services for a given fee. The type of services provided, the geographic coverage, the fee, and the fee payment schedule may vary according to the plan. For example, a wireless service plan may offer only cellular phone services for $20 a month, another wireless service plan may offer cellular phone and wireless Internet access for $30 a month, and another wireless service plan may offer wireless Internet access for $100 a year. The wireless service plans are offered by wireless service provider 50.

Activation web site 48 contains on-line forms to enable wireless device user 47 to submit personal and financial information to wireless service provider 50. The information is used for billing the wireless service plan fee to wireless device user 47. Activation web site 48 also contains an on-line form to be filled with an unique identification code associated with wireless device 49. The identification code may be, for example, the serial number of wireless device 49, the equipment identifier (EID) of the wireless modem in wireless device 49, or any other identification code associated with wireless device 49 and understood by wireless service provider 50. The identification code may be a number, alphanumeric text, or other representation that uniquely identifies wireless device 49. Further, activation web site 48 may contain on-line forms to enable wireless device user 47 to select a username and a password for logging into wireless device 49 when using the wireless services provided by wireless service provider 50.

After filling out each on-line form on activation web site 48, wireless device user 47 clicks a button on activation web site 48 to submit the information to activation web server 51. Activation web server 51 processes the information submitted on activation web site 48 by wireless device user 47 to automatically activate wireless services on wireless device 49.

Activation web server 51 creates a record for wireless device user 47 containing the information submitted on activation web site 48. The record is stored into user database 54 associated with billing server 52. Billing server 52 handles the billing and payment of the wireless service plan fees charged by wireless service provider 50 to wireless device user 47.

Activation web server 51 selects an IP address and a side preference from IP address database 53 to be assigned to wireless device 49. For security reasons, the IP address and the side preference are encoded into an activation code. The activation code may be a hash of the IP address and side preference with appended checksum characters for error correction, or any other secure encoding. The activation code is encoded in a way to prevent the IP address and the side preference from being intercepted by a fraudulent user before reaching wireless device user 47. The IP address, side preference, and activation code may also be stored in the user record in user database 54.

To activate wireless services on wireless device 49, activation server 49 needs to register wireless device 49 with each wireless application server responsible for a given wireless service provided to wireless device user 47 on wireless device 49. Messaging server 55 polls the record associated with wireless device user 47 from user database 54 and registers the record with one or more wireless application servers 56a–c, depending on the wireless services subscribed by wireless device user 47. For example, messaging server 55 may send the record to a wireless e-mail server to register a new wireless e-mail account for wireless device user 47.

To complete the activation process, activation server 51 posts the activation code on activation web site 48 for wireless device user 47. The activation code may be posted in an order confirmation form on activation web site 48. The order confirmation form is a web form that displays a confirmation of the wireless plan subscription subscribed by wireless device user 47.

Upon receiving the activation code, wireless device user 47 logs into wireless device 49 with the username and password selected on activation web site 48 and enters the activation code into a window displayed on the screen of wireless device 49. Alternatively, wireless device user 47 may provide the activation code on wireless device 49 by typing the activation code on a keyboard or PDA screen, clicking on cellular phone keys, or through any other means used on wireless devices for entering information. Wireless device 49 has activation module 57 to decode the activation code back into the IP address and the side preference provided by wireless service provider 50. Activation module 57 registers the IP address and side preference into the memory of the wireless modem in wireless device 49, thereby enabling wireless device 49 to access the wireless services provided by wireless service provider 21.

Activation module 57 also enables wireless device user 47 to specify any preferences associated with the use of the wireless services. The preferences may include a personal web site to be displayed to wireless device user 47 when logging into wireless device 49, a list of favorite web sites, and a list of preferred financial stocks, among others.

It should be understood by one skilled in the art that wireless device user 47 may activate wireless services on multiple wireless devices, activate different wireless service plans, or deactivate the wireless services at any time after activation. Further, one or more of components 48, 51–55, and 56a–c may be provided by a third party other than wireless service provider 50. For example, billing server 52 may be operated by a financial institution rather than wireless service provider 50.

In an alternative embodiment, wireless device user 47 may activate wireless services on wireless device 49 by calling a customer service representative associated with wireless service provider 50. In this case, wireless device user 47 selects a wireless service plan, a username and a password, and provides personal, financial, and device information to the customer service representative over the phone, at a retail store, or through any other customer service means. The customer service representative may then access activation web site 48 to provide the information to activation web server 51, which generates an activation code for wireless device 49. The customer service representative transmits the activation code to wireless device user 47 over the phone, fax, via e-mail, or any other communication means accessible by the customer representative and wireless device user 47.

Figure 5:
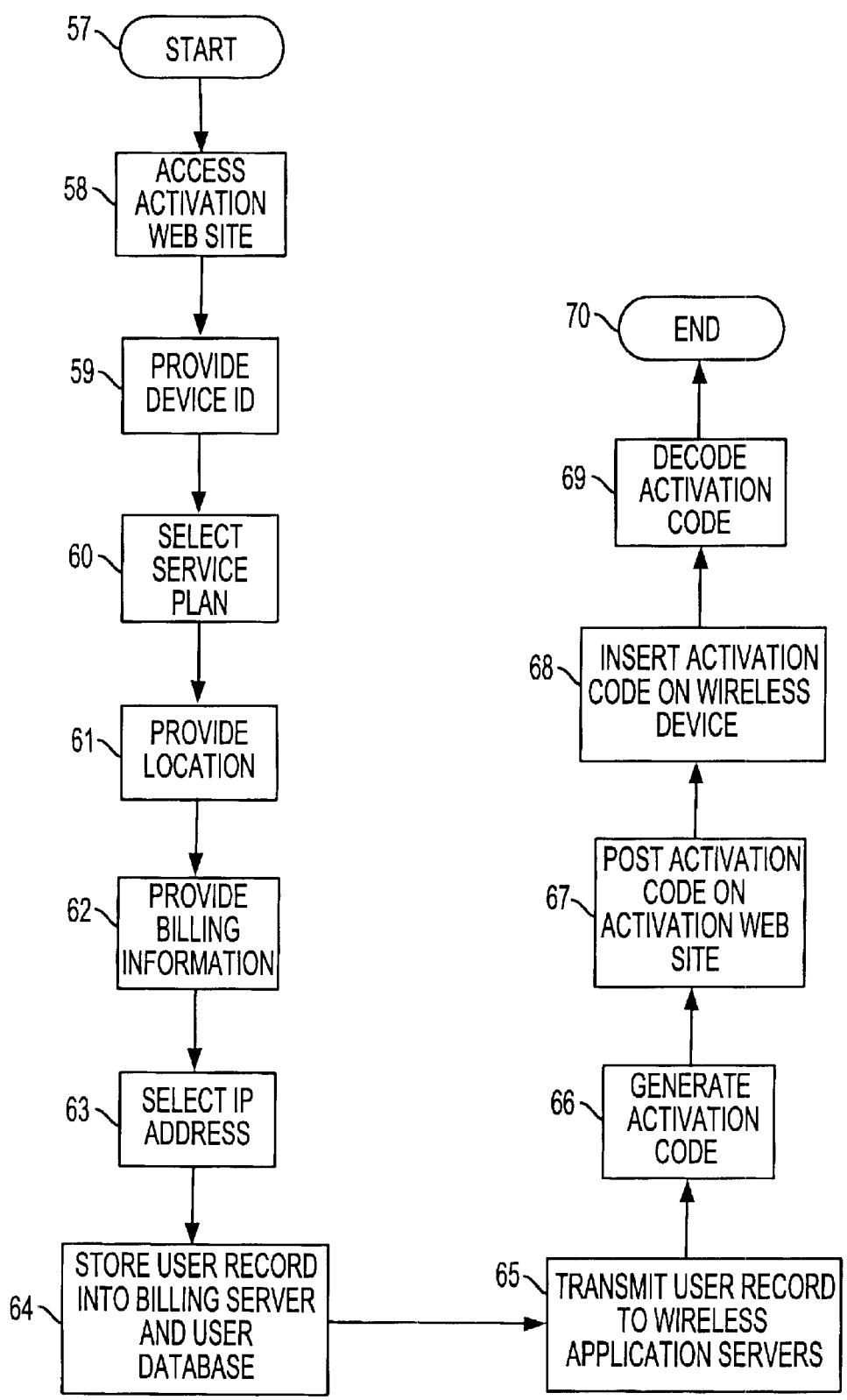
FIG. 5 is a flowchart of a preferred embodiment for activating wireless services on a wireless device.

Referring now to FIG. 5, a flowchart of a preferred embodiment for activating wireless services on a wireless device is described. At step 58, wireless device user 47 accesses activation web site 48 from activation web server 51. At step 59, wireless device user 47 enters an identification code associated with wireless device user 49 into an on-line form provided on activation web site 48. At step 60, wireless device user 47 selects a wireless service plan for subscription according to the wireless services provided in the plan, its geographic coverage, and its fees.

Next, at step 61, wireless device user 47 provides information into an on-line form in activation web site 48 regarding the geographic location where wireless device user 47 plans to use the wireless service plan. The location information is provided for verifying whether the wireless service plan is available on that geographic location, and if so, for selecting the IP address and side preference associated with the wireless carrier operating the wireless network on that location.

At step 62, wireless device user 47 fills an on-line form on activation web site 49 with personal and financial information for the purposes of billing the wireless service plan fees. Next, at step 63, activation web server 51 selects an IP address and side preference from a list of available addresses stored in IP address database 53. At step 64, activation web server 51 creates a user record containing the information provided by wireless device user 47 on activation web site 48 and stores the user record into billing server 52 and user database 54. Next, at step 65, messaging server 55 transmits the user record to wireless application servers 56a–c. At step 66, activation web server 51 generates an activation code for wireless device 49.

Lastly, at step 67, activation web server 51 posts the activation code on activation web site 48. Wireless device user 47 then logs into wireless device 49 and inserts the activation code into wireless device 49 at step 68. At step 49, activation module 57 decodes the activation code back into the IP address and side preference at step 69 and programs the IP address and side preference in the memory of wireless device 49 or in the memory of the wireless modem in wireless device 49. At this point, the wireless services are fully activated and ready for use on wireless device 49.

Figure 6:
FIG. 6 is a screenshot of a web page on the activation web site for entering an identification code associated with the wireless device.

Referring now to FIG. 6, a screenshot of a web page on the activation web site for entering an identification code associated with the wireless device is described. Web page 71 contains on-line form 72 to be filled with a wireless modem EID displayed on the wireless modem of wireless device 49. By clicking button 73, wireless device user 47 submits the information to activation web server 51 and continues the activation process.

Referring now to FIG. 7, a screenshot of a web page on the activation web site for selecting a wireless service plan is described. Web page 74 displays a list of wireless service plans that may be selected by wireless device user 47 to access wireless services on wireless device 49. The list includes annual prepaid service plan 75a, annual service plan 75b, and monthly service plan 75c. Wireless device user 47 selects a service plan by clicking on one of the radio buttons 76a–c. The wireless service plan selection is transmitted to activation web server 51 when the user clicks on button 77.

Referring now to FIG. 8, a screenshot of a web page on the activation web site for providing the geographic location where the wireless device user plans to use the wireless services is described. Web page 78 contains on-line form 79 to allow wireless device user 47 to enter a zip code corresponding to the geographic location where wireless device user 47 plans to use the wireless services. By clicking on button 80, wireless device user 47 submits the location information to activation web server 51, which then verifies that the wireless service plan selected is available on that location. If the wireless service plan is not available on that location, a web page is displayed to wireless device user 47 to inform user 47 that the wireless service plan cannot be used on that location. A map showing the regions where the services are available may also be displayed to wireless device user 47.

Referring now to FIG. 9, a screenshot of a web page on the activation web site for verifying the wireless service plan order is described. Web page 81 shows a summary of the fees to be charged to wireless device user 47 for accessing the wireless service plan. Web page 81 also contains button 82, that when clicked, enables wireless device user 47 to proceed with the activation process.

Figure 10:
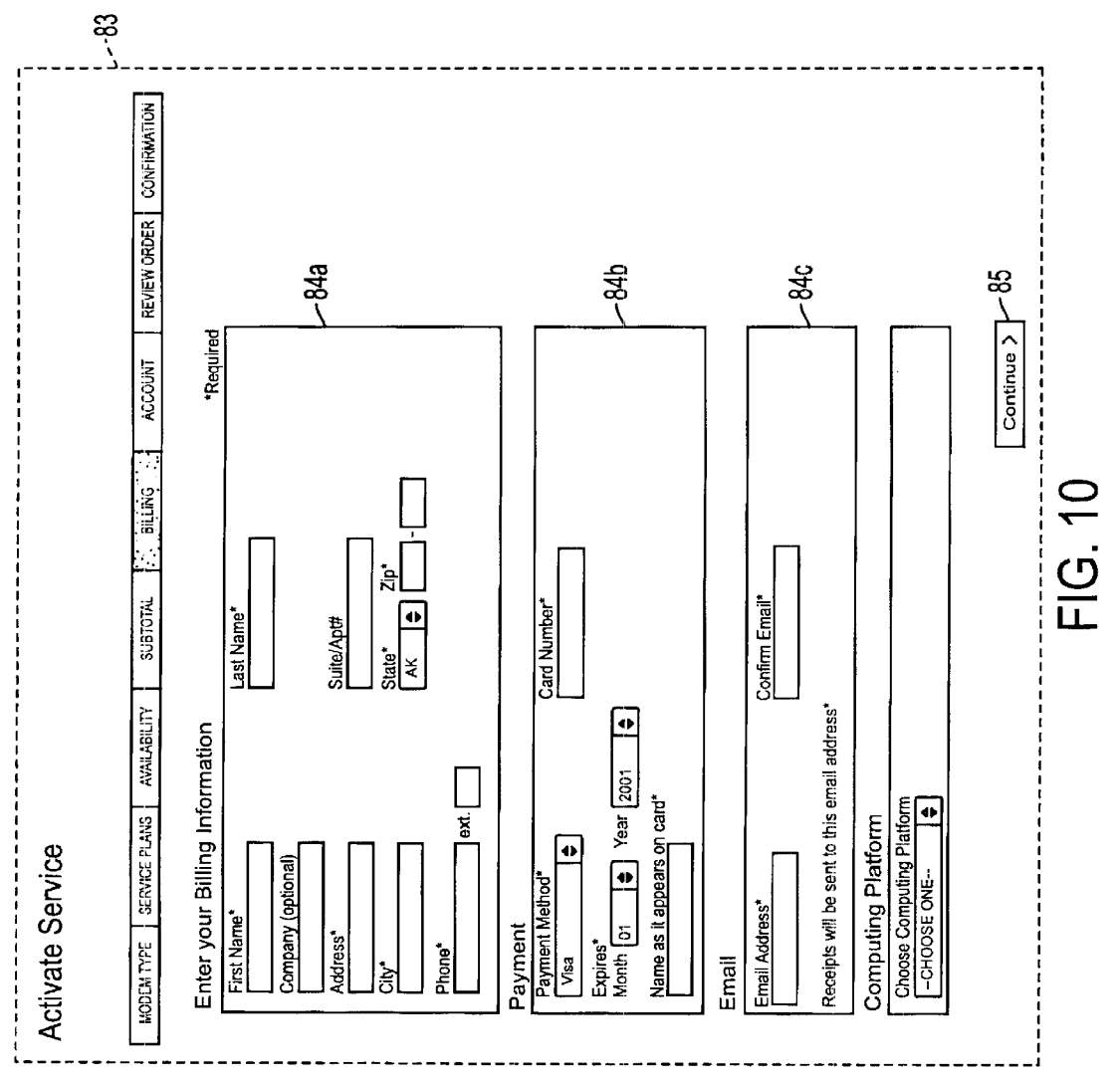

Referring now to FIG. 10, a screenshot of a web page on the activation web site for providing personal and financial information for the purposes of billing the wireless service plan fees is described. Web page 83 contains on-line forms 84a–c to be filled with information provided by wireless device user 47. On-line form 84a is a form to be filled out with a billing address provided by wireless device user 47, on-line form 84b is a form to be filled out with a credit card number provided by wireless device user 47, and on-line form 84c is a form to be filled out with an e-mail address provided by wireless device user 47. Web page 83 also contains button 85, that when clicked, enables wireless device user 47 to proceed with the activation process.

Referring now to FIG. 11, a screenshot of a web page on the activation web site for selecting a username and password to use the wireless services on the wireless device is described. Web page 86 contains on-line forms 87a–c for wireless device user 47 to chose a username and a password for accessing the wireless services on wireless device 49. In addition, web page 86 contains check boxes 88a–c, that when clicked, allow wireless device user 47 to receive newsletters, promotion updates, or any other kind of information provided by wireless service provider 50. Web page 86 also contains button 89, that when clicked, enables wireless device user 47 to proceed with the activation process.

Referring now to FIG. 12, a screenshot of a web page on the activation web site for placing the wireless service plan order is described. Web page 90 shows a summary of the fees to be charged to wireless device user 47 for accessing the wireless service plan as well as the billing information provided by wireless device user 47 and the username selected for accessing the wireless services on wireless device 49.

Web page 90 also contains buttons 91a–b, that when clicked, places the wireless service plan order submitted by wireless device user 47 on activation web site 48 to wireless service provider 50. When buttons 91a or 91b are clicked, the information submitted on activation web site 48 is sent to activation web server 51. Activation web server 51 then selects an IP address and side preference for wireless device 49 from IP address database 53, creates a record associated with wireless device user 47, sends the record to billing server 52, stores the record on user database 54, and creates an activation code encoding the IP address and the side preference for activation module 57 on wireless device 49. Messaging server 55 extracts the user record from user database 54 for activating the wireless services for wireless device 49 with wireless application servers 56a–c. Lastly, activation web server 51 posts the activation code on activation web site 48 for wireless device user 47.

Referring now to FIG. 13, a screenshot of a web page on the activation web site for confirming the wireless service plan order and posting the activation code for the wireless device user is described. Web page 92 displays a summary of the order submitted by wireless device user 47 on activation web site 49, showing the fees to be charged to wireless device user 47 corresponding to the wireless service plan selected, the billing information provided by wireless device user 47, and account information 93 created by wireless service provider 50. Account information 93 consists of an account ID associated with wireless device user 47, the username and password selected by wireless device user 47 to access the wireless services on wireless device 49, and the activation code generated by wireless service provider 50 to activate the wireless services on wireless device 49.

The wireless services become fully activated and ready for use on wireless device 49 when wireless device user 47 executes activation module 57 on wireless device 49. Activation module 57 is executed when wireless device user 47 clicks on an icon or selects a menu item on wireless device 49 to access the wireless services via the wireless network for the first time. When wireless device user 47 logs into the device with the username and password selected through activation web site 48, activation module 57 requests wireless device user 47 to provide the activation code generated by wireless service provider 50.

Depending on the type of wireless device 49, wireless device user 47 may provide the activation code to activation module 57 on wireless device 49 by typing the activation code on a keyboard or PDA screen, clicking on cellular phone keys, or through any other means used on wireless devices for entering information. Activation module 57 then decodes the activation code back into the IP address and side preference and programs them into the memory of the wireless modem in wireless device 49, thereby activating the wireless services for wireless device user 47 on wireless device 49.

Although particular embodiments of the present invention have been described above in detail, it will be understood that this description is merely for purposes of illustration. Specific features of the invention are shown in some drawings and not in others, and this is for convenience only and any feature may be combined with another in accordance with the invention. Steps of the described processes may be reordered or combined, and other steps may be included. Further variations will be apparent to one skilled in the art in light of this disclosure and are intended to fall within the scope of the appended claims.

What is claimed is:

1. A method for automatically activating wireless services on a wireless device, the wireless services provided by a wireless service provider on a wireless network, the method comprising:
   providing an activation web site for a wireless device user to submit device-specific, personal, and billing information to the wireless service provider;
   providing an activation web server to process the information submitted on the activation web site;
   assigning an IP address to the wireless device;
   creating a data record to store the IP address and the information submitted on the activation web site;
   sending the data record to a plurality of wireless application servers;
   creating an activation code for activating the wireless services on the wireless device;
   sending the activation code to the wireless device user;
   providing an activation module on the wireless device to register the activation code on the wireless device; and
   billing the wireless device user for accessing the wireless services on the wireless device.

2. The method of claim 1, wherein the wireless device comprises one or more wireless devices selected from a group consisting of: a personal computer; a portable computer; a cellular phone; a personal digital assistant; an electronic organizer; a set-top box; and an entertainment system.

3. The method of claim 1, wherein the wireless services comprise wireless services offered as part of a wireless service plan provided by the wireless service provider.

4. The method of claim 1, wherein the wireless services comprise one or more services selected from a group consisting of: cellular phone service; e-mail service; web access; financial trading; and location-based services.

5. The method of claim 4, wherein location-based services comprise wireless services offered to the wireless device user based on the location of the wireless device user on the wireless network.

6. The method of claim 1, wherein the activation web site comprises on-line forms and buttons for the wireless device user to submit device-specific, personal, and billing information to the activation web server.

7. The method of claim 1, wherein the device-specific information comprises a unique identification code identifying the wireless device for the wireless device user and the wireless service provider.

8. The method of claim 7, wherein the identification code comprises a serial number associated with the wireless device or an equipment identifier associated with a wireless modem of the wireless device.

9. The method of claim 1, wherein the personal information comprises name and address information associated with the wireless device user.

10. The method of claim 1, wherein the billing information comprises a credit card number and a billing address associated with the wireless device user.

11. The method of claim 1, wherein the IP address comprises an IP address provided by a wireless carrier to the wireless service provider, the wireless carrier operating a wireless network through which the wireless services are accessed.

12. The method of claim 1, wherein assigning the IP address to the wireless device comprises selecting the IP address from an IP address database storing a plurality of IP addresses available for use on the wireless network.

13. The method of claim 1, wherein the data record is stored in a user database.

14. The method of claim 1, further further comprising storing the data record in a billing server.

15. The method of claim 14, wherein the billing server generates a financial statement for the wireless user to charge the wireless user for accessing the wireless services on the wireless device.

16. The method of claim 1, wherein sending the data record to a plurality of wireless application servers comprises providing a messaging server to extract the data record from the user database and send the data record to the plurality of wireless application servers.

17. The method of claim 1, wherein the activation code comprises a secure encoding of the IP address and a side preference associated with the wireless carrier.

18. The method of claim 17, wherein the secure encoding comprises a secure hash of the IP address and the side preference.

19. The method of claim 1, wherein sending the activation code to the wireless device user comprises posting the activation code on the activation web site.

20. The method of claim 19, further comprising sending the activation code to a customer service representative for providing the activation code to the wireless device user.

21. The method of claim 1, wherein providing an activation module on the wireless device to register the activation code on the wireless device comprises providing a software routine on the wireless device for decoding the activation code into the IP address and the side preference.

22. The method of claim 21, wherein the software routine further comprises a software routine for registering the IP address and the side preference into the wireless device's memory.

23. The method of claim 1, wherein billing the wireless device user for accessing the wireless services on the wireless device comprises charging the credit card number with fees associated with the wireless services.

24. A system for automatically activating wireless services on a wireless device, the wireless services provided by a wireless service provider on a wireless network, the system comprising:

an activation web site for a wireless device user to submit device-specific, personal, and billing information to the wireless service provider;

an activation web server to process the information submitted on the activation web site and create an activation code for activating the wireless services on the wireless device;

an IP address database storing a plurality of IP addresses for use by the wireless device on the wireless network;

a user database to store a data record containing the information submitted on the activation web site;

a plurality of wireless application servers;

a messaging server for sending the data record to the plurality of wireless application servers;

an activation module on the wireless device for registering the activation code on the wireless device; and a billing server for generating a financial statement to the wireless device user for accessing the wireless services on the wireless device.

25. The system of claim 24, wherein the wireless device comprises one or more wireless devices selected from a group consisting of: a personal computer; a portable computer; a cellular phone; a personal digital assistant; an electronic organizer; a set-top box; and an entertainment system.

26. The system of claim 24, wherein the wireless services comprise wireless services offered as part of a wireless service plan provided by the wireless service provider.

27. The system of claim 24, wherein the wireless services comprise one or more services selected from a group consisting of: cellular phone service; e-mail service; web access; financial trading; and location-based services.

28. The system of claim 27, wherein location-based services comprise wireless services offered to the wireless device user based on the location of the wireless device user on the wireless network.

29. The system of claim 24, wherein the activation web site comprises on-line forms and buttons for the wireless device user to submit device-specific, personal, and billing information to the activation web server.

30. The system of claim 24, wherein the device-specific information comprises a unique identification code identifying the wireless device for the wireless device user and the wireless service provider.

31. The system of claim 24, wherein the personal information comprises name and address information associated with the wireless device user.

32. The system of claim 24, wherein the billing information comprises a credit card number and a billing address associated with the wireless device user.

33. The system of claim 24, wherein the IP address comprises an IP address provided by a wireless carrier to the wireless service provider, the wireless carrier operating a wireless network through which the wireless services are accessed.

34. The system of claim 24, wherein the activation code comprises a secure encoding of the IP address and a side preference associated with the wireless carrier.

35. The system of claim 34, wherein the secure encoding comprises a secure hash of the IP address and the side preference.

36. The system of claim 24, wherein the activation web server posts the activation code is to the wireless device user on the activation web site.

37. The system of claim 24, wherein the activation code is sent to a customer service representative for providing the activation code to the wireless device user.

38. The system of claim 24, wherein the activation module comprises a software routine on the wireless device for decoding the activation code into the IP address and the side preference.

39. The system of claim 38, wherein the software routine further comprises a software routine for registering the IP address and the side preference into the wireless device's memory.

40. The system of claim 24, wherein generating a financial statement comprises charging the credit card number with fees associated with the wireless services.

* * * * *